United States Patent
Tsukimoto et al.

[11] Patent Number: 5,917,270
[45] Date of Patent: *Jun. 29, 1999

[54] VIBRATION DRIVEN MOTOR OR ACTUATOR

[75] Inventors: Takayuki Tsukimoto, Fujisawa; Ichiro Okumura, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/538,038

[22] Filed: Oct. 2, 1995

Related U.S. Application Data

[63] Continuation of application No. 08/167,144, Dec. 16, 1993, abandoned.

[30] Foreign Application Priority Data

Dec. 17, 1992 [JP] Japan ................................ 4-337387

[51] Int. Cl.$^6$ ..................................................... H01L 41/08
[52] U.S. Cl. .......................................................... 310/323.12
[58] Field of Search ....................... 310/323, 328, 310/321

[56] References Cited

U.S. PATENT DOCUMENTS

| | | | |
|---|---|---|---|
| 4,580,073 | 4/1986 | Okumura et al. | 310/323 |
| 4,587,452 | 5/1986 | Okumura et al. | 310/328 |
| 4,678,956 | 7/1987 | Izukawa et al. | 310/323 |
| 4,692,650 | 9/1987 | Okumura et al. | 310/323 |
| 4,752,711 | 6/1988 | Tsukimoto et al. | 310/323 |
| 4,788,468 | 11/1988 | Izukawa et al. | 310/323 |
| 4,831,305 | 5/1989 | Mukohjima et al. | 310/323 |
| 4,884,002 | 11/1989 | Eusemann et al. | 310/323 |
| 5,028,833 | 7/1991 | Kawai | 310/323 |
| 5,051,647 | 9/1991 | Uchikawa et al. | 310/323 |
| 5,107,163 | 4/1992 | Umemura et al. | 310/323 |
| 5,134,333 | 7/1992 | Atsuta | 310/323 |
| 5,204,577 | 4/1993 | Watanabe et al. | 310/323 |
| 5,233,257 | 8/1993 | Luthier et al. | 310/323 |
| 5,256,928 | 10/1993 | Nishikura et al. | 310/323 |
| 5,274,295 | 12/1993 | Tsukimoto | 310/323 |
| 5,298,829 | 3/1994 | Tsukimoto et al. | 310/323 |
| 5,300,850 | 4/1994 | Okumura et al. | 310/323 |
| 5,363,006 | 11/1994 | Yano et al. | 310/323 |
| 5,402,030 | 3/1995 | Mukohjima | 310/323 |
| 5,436,522 | 7/1995 | Tsukimoto et al. | 310/323 |
| 5,472,662 | 12/1995 | Yano et al. | 310/323 X |

FOREIGN PATENT DOCUMENTS

| | | |
|---|---|---|
| 0441540 | 8/1991 | European Pat. Off. . |
| 0469881 | 2/1992 | European Pat. Off. . |
| 0473423 | 3/1992 | European Pat. Off. . |
| 0507264 | 10/1992 | European Pat. Off. . |
| 61-150677 | 7/1986 | Japan . |
| 61-224882 | 10/1986 | Japan . |
| 63-174581 | 7/1988 | Japan . |
| 0224679 | 9/1988 | Japan ................................ 310/323 |
| 4091672 | 3/1992 | Japan . |
| 491672 | 3/1992 | Japan . |

OTHER PUBLICATIONS

European Search Report dated Jan. 2, 1996.

*Primary Examiner*—Mark O. Budd
*Attorney, Agent, or Firm*—Fitzpatrick, Cella, Harper & Scinto

[57] ABSTRACT

A vibration driven motor or actuator including a vibration member, having a contact portion, for generating a vibration therein, and a contact member including a contact portion which is in contact with the contact portion of said vibration member, the vibration causing relative movement between the vibration member and the contact member, and means for shifting a neutral plane of a vibration generated in the contact member in a direction toward the contact portion of the vibration member.

14 Claims, 14 Drawing Sheets

NEUTRAL PLANE N

SHRINKAGE
EXPANSION
OSCILLATOR
N

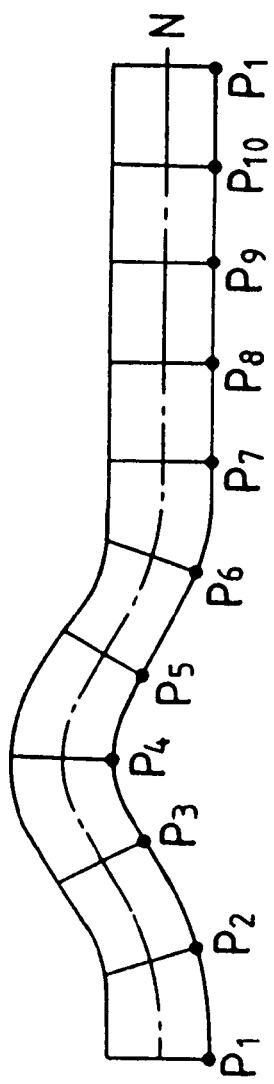
FIG. 9(a) t=0
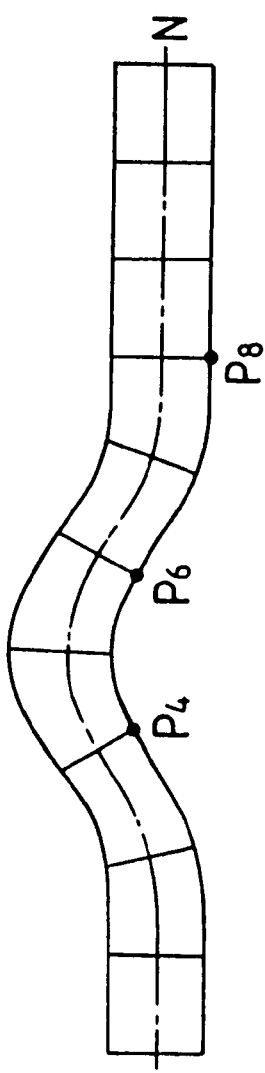
FIG. 9(b) t=$\frac{1}{10}$T
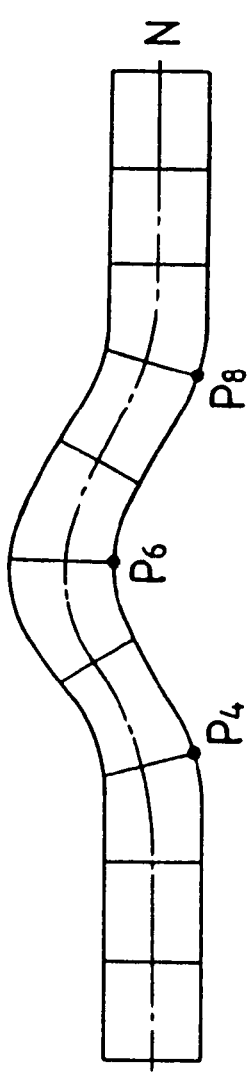
FIG. 9(c) t=$\frac{2}{10}$T
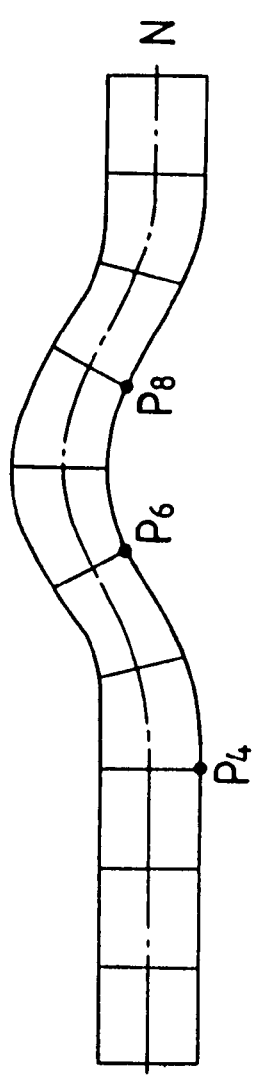
FIG. 9(d) t=$\frac{3}{10}$T

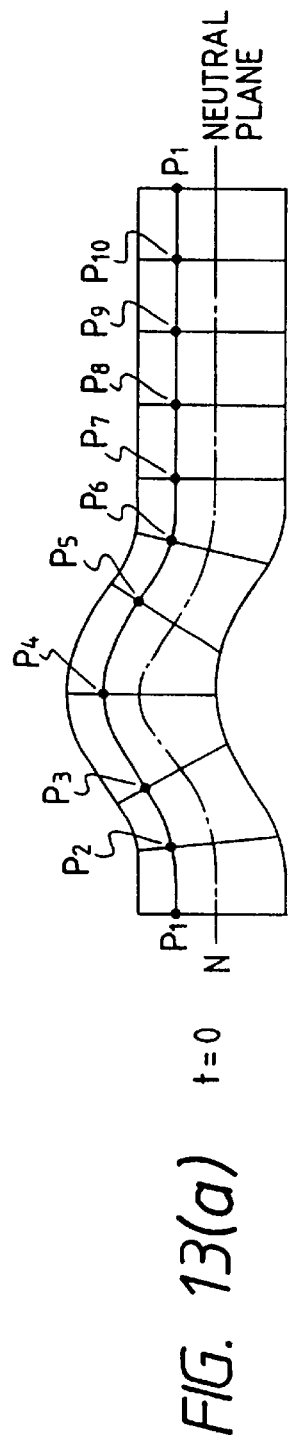
FIG. 13(a)  t=0
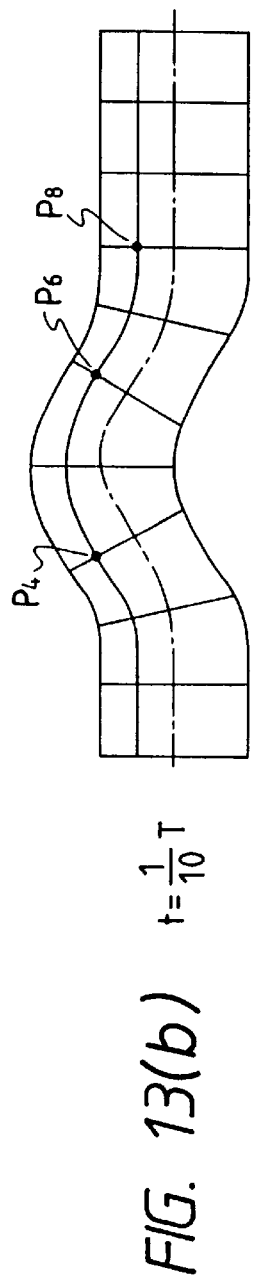
FIG. 13(b)  t=1/10 T
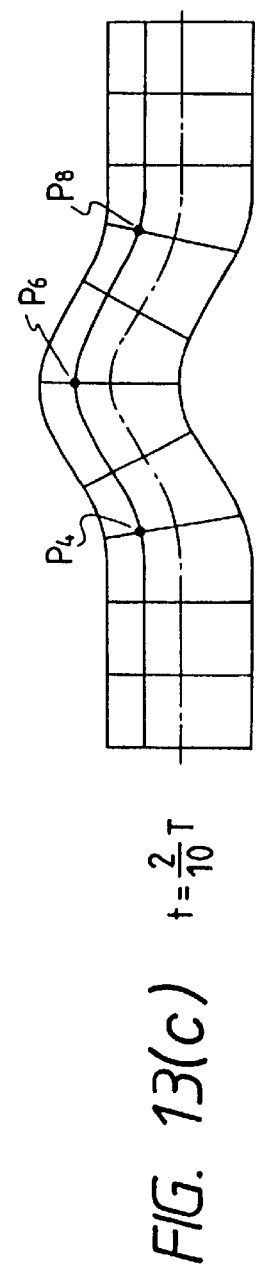
FIG. 13(c)  t=2/10 T
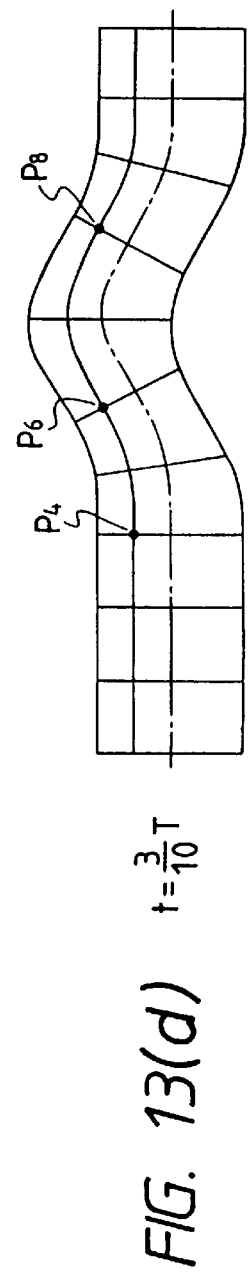
FIG. 13(d)  t=3/10 T

CONTACT REGION

DIRECTION A

VIBRATION DRIVEN MOTOR OR ACTUATOR

This application is a continuation of application Ser. No. 08/167,144 filed Dec. 16, 1993 now abandoned.

BACKGROUND OF THE INVENTION

1. Field of the Invention

This invention relates to a vibration driven motor or actuator.

2. Related Background Art

FIG. 2 shows polarization patterns and an arrangement of piezoelectric elements (PZT) used in an oscillator (or a vibration member) formed in a rod-like shape in a vibration driven motor (ultrasonic driven motor). Each piezoelectric element PZT is subjected to polarization processing, so that right and left portions on opposite side of a central line (as a boundary) have opposite polarities. These piezoelectric elements are grouped into A and B phase groups each including two piezoelectric elements, and the A and B phase groups are arranged to have a 90° phase difference therebetween. Note that the lowermost piezoelectric element is used for vibration detection (S phase), and although not shown, electrode plates are inserted between each two adjacent piezoelectric elements.

The driving principle will be described below with reference to FIG. 3. When an AC voltage is applied to only the A phase, a primary flexural natural vibration is excited in an oscillator 1 in a direction parallel to the plane of the drawing of FIG. 3 by expansion/shrinkage of the piezoelectric elements. When an AC voltage is applied to only the B phase, a vibration is generated in a direction perpendicular to the plane of the drawing of FIG. 3.

When a vibration in the horizontal direction excited by the A phase and a vibration in the vertical direction excited by the B phase are applied with a 90° temporal phase difference therebetween, a clockwise or counterclockwise motion with respect to the longitudinal axis is generated in the oscillator 1. Since the oscillator 1 has a circumferential groove 1q for amplifying the displacement, an oscillating motion shown by the arrows in FIG. 3 is generated at the distal end of the oscillator 1. When viewed from the contact surface (the upper surface of the oscillator), this vibration corresponds to a single travelling wave. When a rotor 2 having a contact spring portion is brought into press contact with the oscillator, the rotor contacts the stator at only one portion located near the wavefront, and is rotated in the reverse direction of the travelling wave. The output is extracted by a gear 4 attached to the outer circumferential surface of a ball bearing 3 at the upper portion of the rotor a.

In the rod-shaped vibration driven motor, a support pin rod 5 (shaft distal end)—flange 6 system is integrated, and the natural mode of the oscillator is FEM-analyzed, so that the vibration amplitude of the flange 6 is minimized. For this reason, the rod-like vibration driven motor has a very small support loss as compared to a ring-shaped oscillator.

On the other hand, a contact portion 7 having a spring structure is formed on the lower portion of a rotor main ring of the rotor 2, and has a natural frequency sufficiently higher than the vibration application frequency of the oscillator as in a ring-shaped oscillator, so that it can follow the driving vibration. The rotor main ring has a sufficiently large inertial mass, so that no vibration is excited by a vibration applied from the oscillator.

One drawback of a vibration driven motor is its low motor efficiency. In general, in a rod-shaped vibration driven motor, since an oscillator is supported by an elastic member using a metal pin consisting of, e.g., stainless steel, the support loss is small. Also, since the oscillator and the rotor consist of a material such as brass, aluminum, or the like, which causes less internal vibration attenuation, their internal losses are also small.

Therefore, a loss due to slippage at the contact portion between the rotor and a stator is the dominant factor of energy losses in such a motor, and the object of this invention is to improve motor efficiency by eliminating this loss factor.

The slippage at the contact portion can be classified into a radial slippage and circumferential slippage in a cylindrical coordinate system having the rotational axis of the rotor as the center. Methods of preventing radial slippage have been disclosed in Japanese Laid-Open Patent Application Nos. 61-224882, 63-174581, and the like. However, no countermeasures are conventionally taken against the circumferential slippage.

A mechanism of the circumferential slip will be described below.

FIG. 4A shows the peripheral speed corresponding to the vibration displacement on the contact surface of an oscillator at a certain time by respective lengths and directions of arrows, and FIG. 4B shows the peripheral speed distribution at that time. As can be seen from FIG. 4B, a vibration formed on the contact surface of the oscillator as a stator has a high speed near the wavefront.

FIG. 5 shows the state of the contact portion of a movable member, such as a rotor, contacting the oscillator. Referring to FIG. 5, a solid waveform represents the displacement of the oscillator, and a broken waveform represents the displacement of the rotor. The respective speeds at two points A and B on the contact surfaces of the oscillator and the rotor may be represented by $V_{as}$ (the speed of the oscillator at the point A), $V_{ar}$ (the speed of the rotor at the point A), $V_{bs}$ (the speed of the oscillator at the point B), and $V_{br}$ (the speed of the rotor at the point B).

Although the rotor is rotated at a certain peripheral speed $v_0$ by, e.g., an inertia, since the rotor contact surface contacts the vibration surface of the oscillator over a finite length, the rotor contact surface is fed at the respective contact points at different peripheral speeds $v_{as}$ to $v_{bs}$. Therefore, contact portions corresponding to rotor peripheral speeds other than $v_0$ cause slippage. For example, slippage of a relative speed $v_{as}-v_0$ occurs at the point A, and slippage of a relative speed $v_0-v_{bs}$ occurs at the point B.

The product of the slip in the circumferential direction (driving direction) with the frictional force corresponds to a power loss at the sliding portion, and the object of this invention is to reduce or eliminate this power loss.

The reason why the above-mentioned speed difference occurs will be described below with reference to FIGS. 7 to 10.

FIG. 7 shows the radial flexure distribution on a neutral plane (indicated by a dotted curve) N in the contact spring portion formed on the rotor, and FIG. 8 shows the flexural deformation state in the circumferential direction at that time. As shown in FIG. 8, in the contact state with the oscillator, the circumferential distortion of the contact surface in the contact spring of the rotor is shrinkage (the speed is low) near the wavefront to have the neutral plane as the center, and expansion (the speed is high) near a contact release point. FIG. 9 shows temporal transitions of a point position on the contact surface as a vibration wave travel. T represents the time required for a travelling wave to travel one wavelength for one cycle, the vibration wave of the oscillator travels from the left to the right in the plane of the drawing in FIG. 9, and the vibration wave of the rotor travels from the right to the left in the plane of the drawing in FIG. 9.

Referring to FIG. 9, a point $P_6$ moves from the left to the right at t=$\frac{1}{10}$T, the entire rotor moves from the right to the left at a peripheral speed $v_r$, and the central point $P_6$ of the deformation also has a speed $\Delta vp_6$ due to the deformation. Note that a speed $\Delta v_4$ by the deformation of a point $P_4$ at t=$\frac{2}{10}$T has a direction opposite to that of $\Delta p_6$. FIG. 10 shows the speed distribution when the deformation sequentially occurs in this manner. In FIG. 10, the direction of the rotor peripheral speed is defined to be the positive direction.

On the other hand, the peripheral speed distribution on the contact surface of the oscillator has a sine wave state, as shown in FIG. 11, and a difference $\Delta v$ between the peripheral speeds of the oscillator and the rotor has a distribution state shown in FIG. 12 in the contact region.

SUMMARY OF THE INVENTION

It is an object of the present invention to eliminate or reduce the above-mentioned sliding loss.

Other objects of the present invention will become apparent from the following detailed description of the present invention.

One aspect of the present invention is to eliminate or reduce the speed difference between the contact surfaces of an oscillator and a rotor. In other words, a peripheral speed difference $\Delta v$ between the contact surfaces of the rotor and the oscillator at two arbitrary points and a peripheral partial velocity difference $\Delta v$ of the oscillator main body at the two points satisfy the relation $\Delta V > \Delta v$.

This will be described more easily with reference to FIG. 5.

$$\Delta v = (v_{as} - v_{ar}) - (v_{bs} - v_{br})$$

$$\Delta V = v_{as} - v_{bs}$$

That is, paying attention to the rotor, the peripheral speed near the wavefront is set to be high, e.g., $v_{ar} > v_{br}$.

Note that the peripheral speed of the oscillator main body represents the peripheral speed of the contact surface when no contact spring portion is provided in contact with the oscillator, and represents the peripheral speed distribution of the contact surface obtained when the contact spring portion is not deformed by the frictional force (a non-contact state with the rotor), when the contact spring portion is provided in contact with the oscillator.

As means for satisfying the above-mentioned relationship:

(1): a sliding surface is defined by a plurality of surface portions (divided), and each surface portion is allowed to be independently displaceable, thereby preventing circumferential slippage; and (2): the peripheral speed distribution of the rotor contact surface is set to be close to that on the contact surface of the oscillator main body, thereby decreasing the speed difference therebetween.

As an arrangement for realizing these means, the means (1) for dividing the sliding surface of the contact spring portion into a plurality of surface portions can be realized by providing circumferential flexibility to each contact surface portion.

The contact spring portion preferably consists of a material such as a metal having a small internal attenuation although it can consist of a resin. For example, the above-mentioned means (1) may be realized by finely dividing the conventional contact spring portion into small portions in the circumferential direction. In this case, the finely divided contact surface portions are required to sufficiently respond to the driving frequency.

The circumferential length of each divided contact surface portion is preferably as small as possible. This is because since the speed difference generated in the contact surface is decreased as the contact surface becomes shorter, a sliding loss in the surface is decreased.

If possible, it is desirable that each divided contact surface portion has a size within a range in which the speed difference can be completely absorbed by shearing deformation in the material of the contact surface. This size varies depending on the contact portion material, the frictional force, the speed difference, and the like, and is very small for a metal material. If a resin or rubber is used, this range can be increased, and the size of each contact surface portion can be increased. However, since the resin or rubber is soft in the axial direction, it also causes a large deformation in this direction by a driving vibration, resulting in a decrease in motor rotational speed.

It is desirable to provide anisotropy (i.e., stiffness in the radial direction, and softness in the circumferential direction) by, e.g., adding fibers arranged in the vibration displacement direction.

It is not preferable that any two adjacent contact portions or segments constituting the divided contact surface be separated by a large distance. More specifically, as shown in FIG. 6, when any two adjacent contact surface portions are separated by a large distance, a non-contact time with a portion near the wavefront having a high peripheral speed is generated. Then, the motor rotational speed decreases, and energy to be extracted is decreased, thus impairing motor efficiency accordingly.

Therefore, a large number of contact segments must be present in each wavelength of a driving vibration.

A method of defining the rotor contact surface by a plurality of surface portions is disclosed in Japanese Laid-Open Patent Application No. 61-150677, and a method of dividing the contact portion in the circumferential direction is disclosed in Japanese Laid-Open Patent Application No. 4-91672. However, these methods utilize a surface deformation of the contact surface formed as a result of machining. For this reason, the number of surface portions in each wavelength is small, and since a surface deformation method is utilized, contact spring portions are required to have flexibility in a direction outside the contact surface, e.g., the axial direction in a rod-shaped vibration driven motor. Therefore, these methods have different objects and arrangements from those of the present invention.

On the other hand, as the above-mentioned means (2) for decreasing the speed difference between the rotor and the oscillator by setting the peripheral speed distribution of the rotor contact surface to be close to that on the contact surface of the oscillator main body, if the neutral plane of a flexure of the contact portion is present outside the contact surface, then the temporal transitions of a point position on the contact surface become as shown in FIG. 13, and the peripheral speed distribution caused by the flexural deformation at this time becomes as shown in FIG. 14. The peripheral speed distribution at this time becomes close to that shown in FIG. 11, and the speed difference between the contact surfaces of the rotor and the oscillator can be decreased.

BRIEF DESCRIPTION OF THE DRAWINGS

FIG. 9 is a view showing the moving state of points on the contact surface;

FIG. 13 is a view showing the moving state of points on the contact surface of a rotor according to the first embodiment;

DESCRIPTION OF THE PREFERRED EMBODIMENTS

Figure 1:
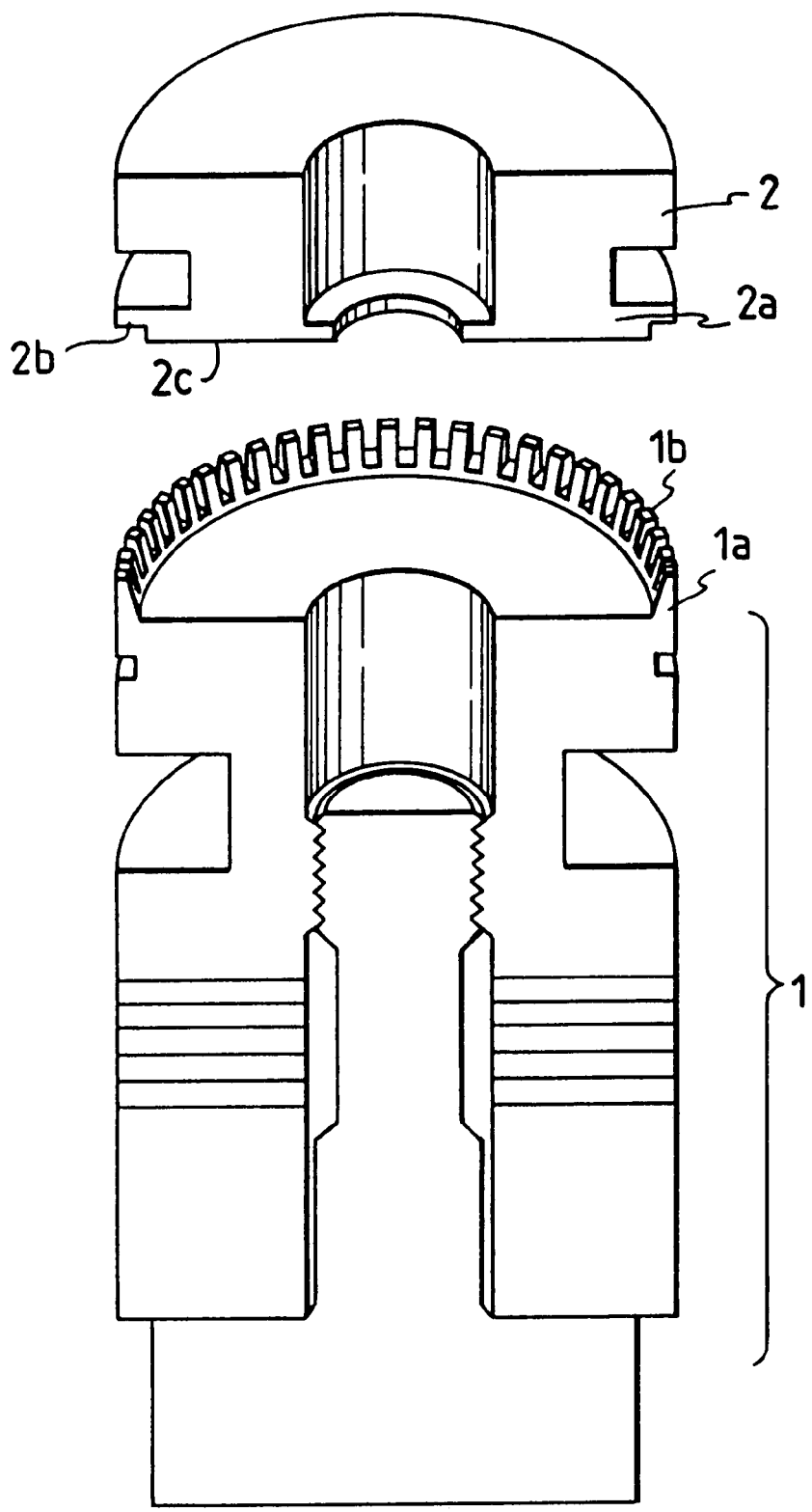
FIG. 1 is a perspective view showing a first embodiment of the present invention.
Figure 2:
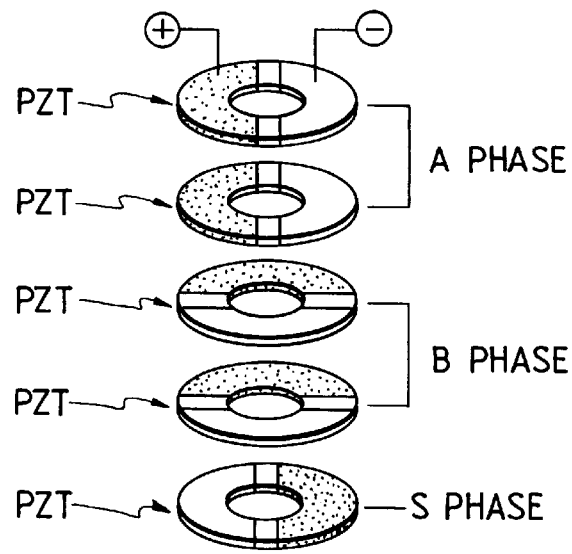
FIG. 2 is a perspective view showing polarization patterns of piezoelectric elements.
Figure 3:
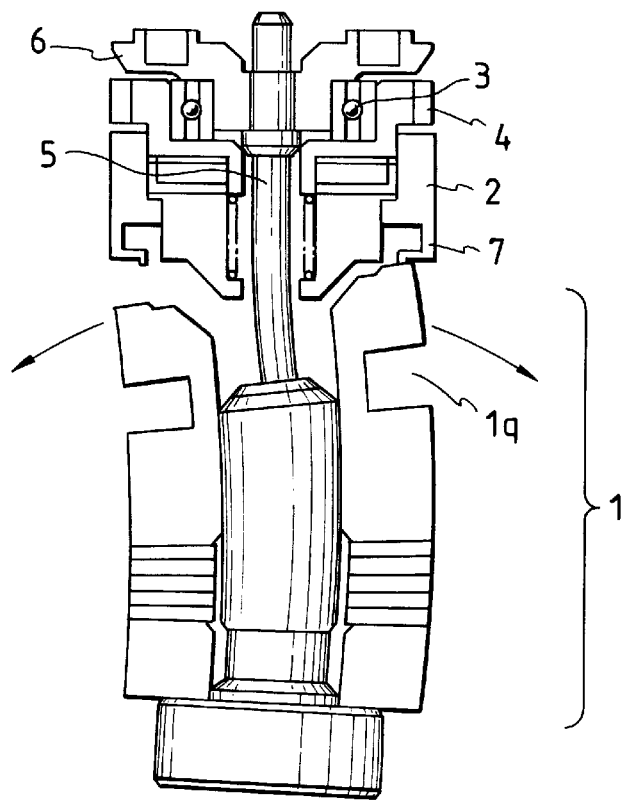
FIG. 3 is a sectional view showing an arrangement of a rod-shaped vibration driven motor.

FIG. 1 shows a first embodiment of the present invention.

This embodiment relates to a rod-shaped vibration driven motor (ultrasonic driven motor). A contact spring portion 2a formed on the lower portion of a rotor 2 has flexibility in the axial direction to absorb a surface deformation generated upon machining of a contact surface, and to properly deform according to a driving vibration. A thin outer circumferential portion 2b is used as a contact portion, and a base portion 2a is formed to project downward from the contact surface of the contact portion. Thus, as shown in FIG. 13, a neutral plane N of a flexure at the contact position of the rotor 2 is set at a level lower than the contact surface to set the peripheral speed distribution on the contact surface of an oscillator to be close to that on the rotor contact surface, thereby reducing the speed difference therebetween.

Figure 4A:
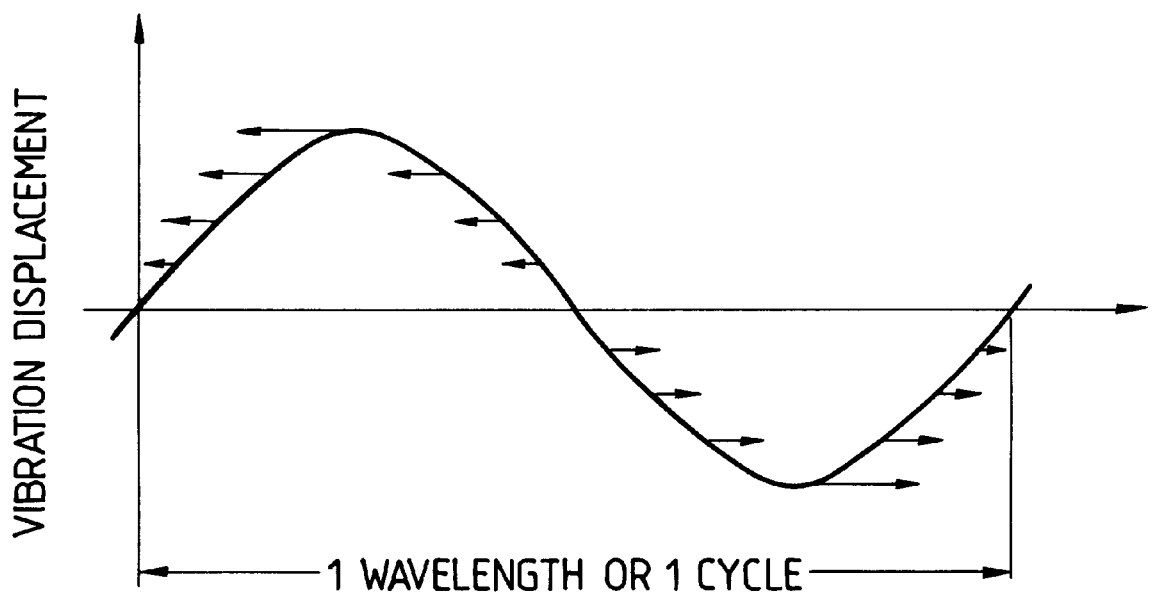
FIG. 4A is a graph showing the relationship between the vibration deformation and the peripheral speed of an oscillator.
Figure 4B:
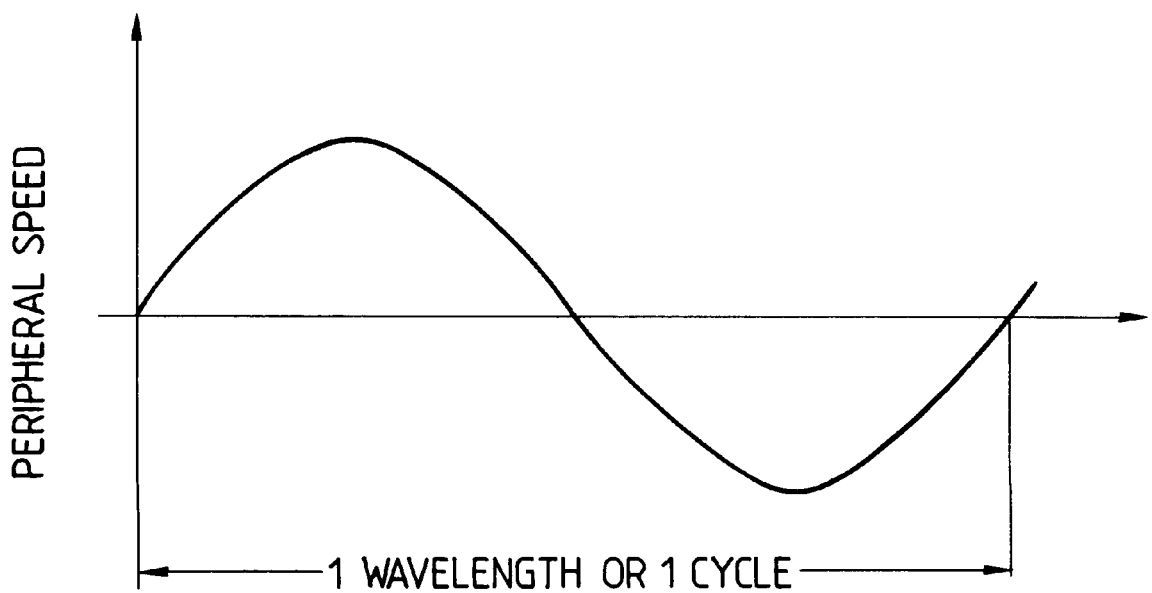
FIG. 4B is a graph showing the peripheral speed distribution in one wavelength or one cycle.
Figure 5:
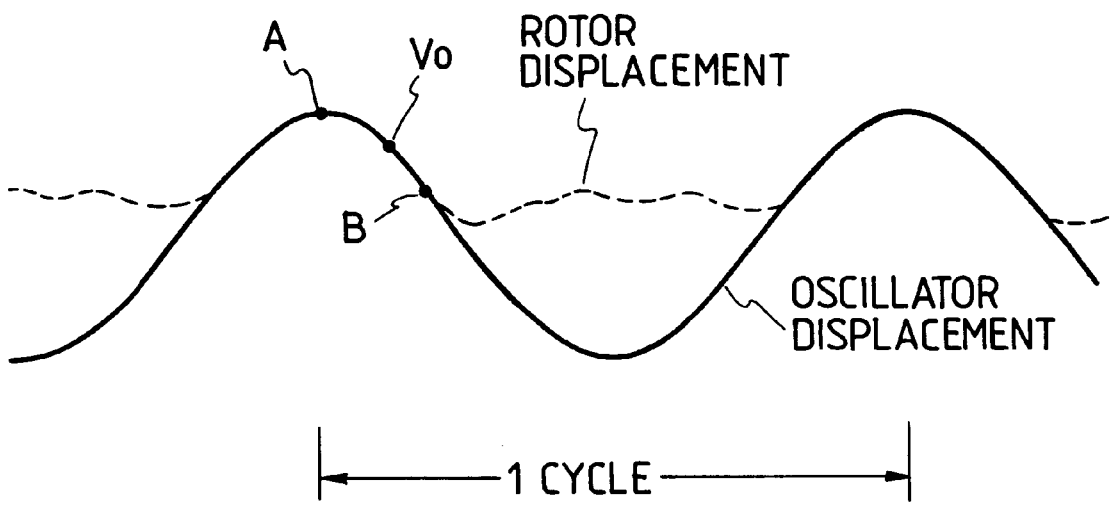
FIG. 5 is a graph showing a contact state of a rotor.
Figure 6:
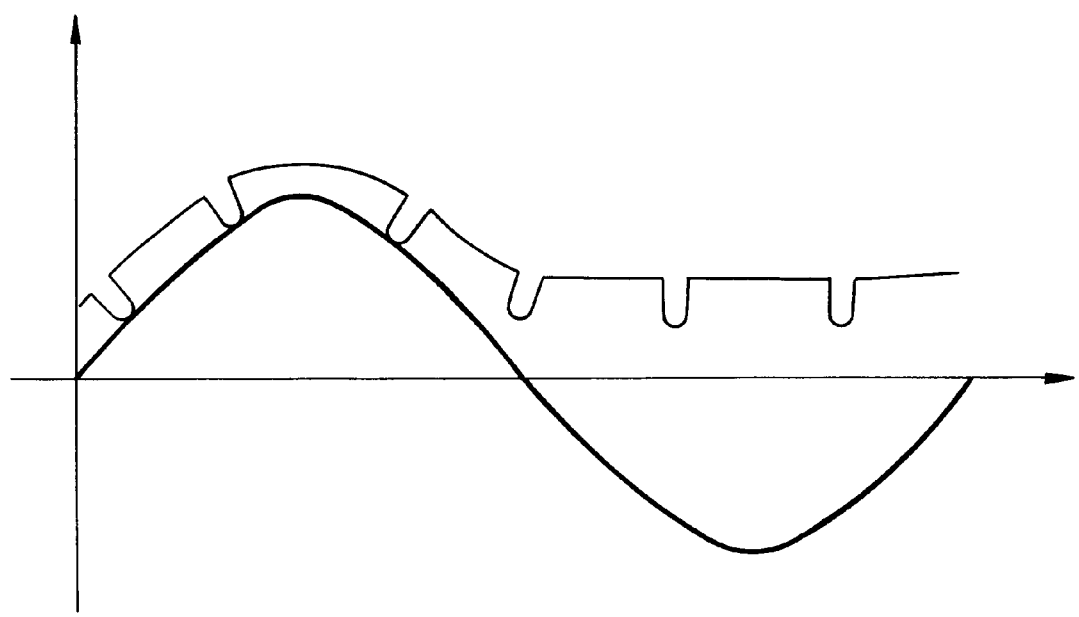
FIG. 6 is a graph showing a contact state of the rotor.
Figure 7:
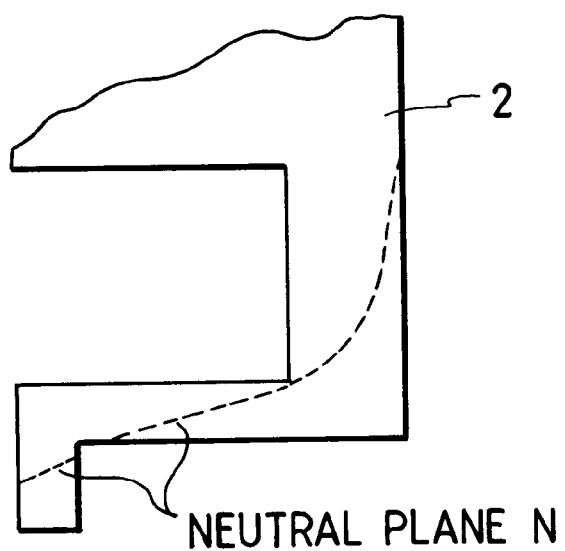
FIG. 7 is a sectional view showing a neutral plane of the rotor.
Figure 8:
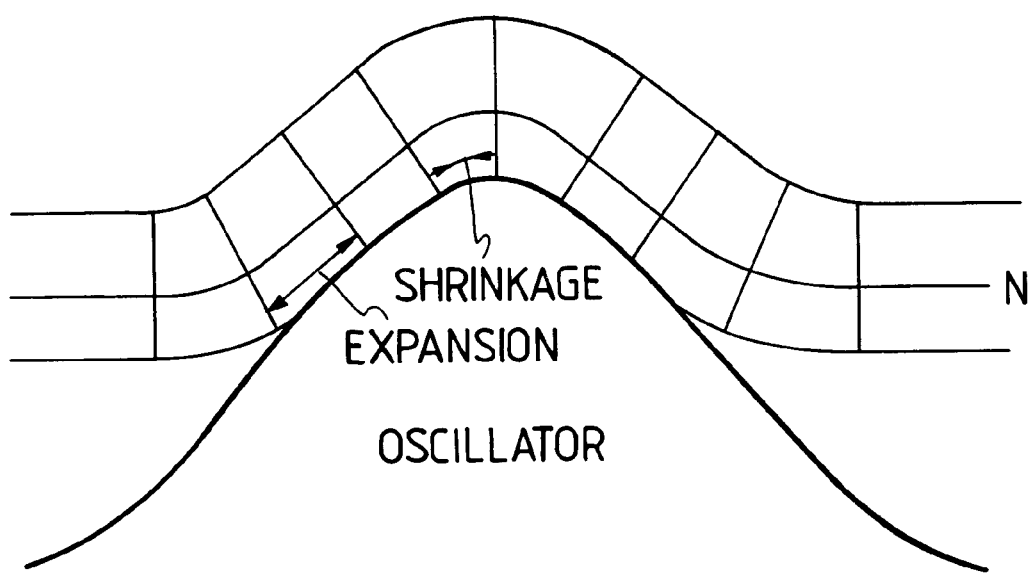
FIG. 8 is a circumferential exploded view of the neutral plane by contact.
Figure 10:
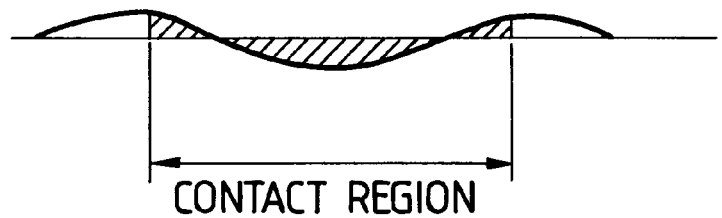
FIG. 10 is a graph showing the peripheral speed distribution of the rotor contact surface.
Figure 11:
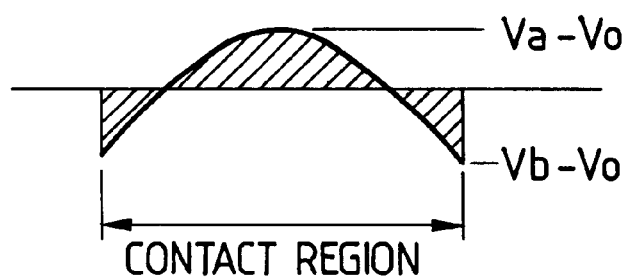
FIG. 11 is a graph showing the peripheral speed distribution of the oscillator contact surface.
Figure 12:
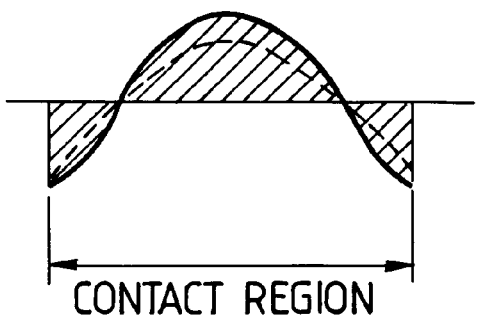
FIG. 12 is a graph showing the peripheral speed difference between the contact surfaces of the rotor and the oscillator.
Figure 14:
FIG. 14 is a graph showing the peripheral speed distribution on the rotor contact surface in the first embodiment.
Figure 15:
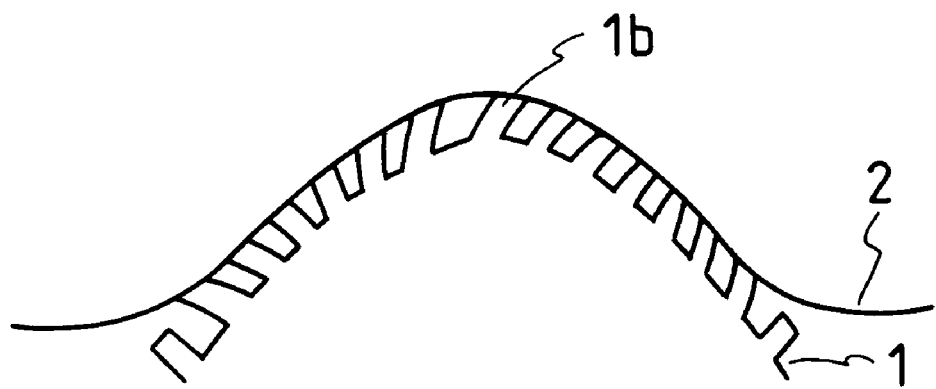
FIG. 15 is a sectional view showing a deformation state of a contact spring portion in the circumferential direction of an oscillator in the first embodiment.

More specifically, upon comparison between FIGS. 13 and 9, the speed of the contact surface near the wavefront is lower in FIG. 9, while the speed of the contact surface near the wavefront is higher in FIG. 13 of this embodiment. Therefore, since the peripheral speed distribution of the rotor becomes similar to that of the oscillator shown in FIG. 4B, circumferential slippage is reduced ($\Delta v \approx 0$).

In addition, this embodiment takes a countermeasure against circumferential slippage not only for the rotor but also for the oscillator. A contact spring portion 1a formed on a driving portion of an oscillator 1 is designed to have a structure having flexibility in the radial direction so as to prevent radial slippage. Also, the distal end portion of the contact spring 1a is divided in the circumferential direction to form a large number of projections 1b, and these projections 1b are designed to have a structure having flexibility in the circumferential direction, thereby preventing circumferential slippage.

Figure 16:
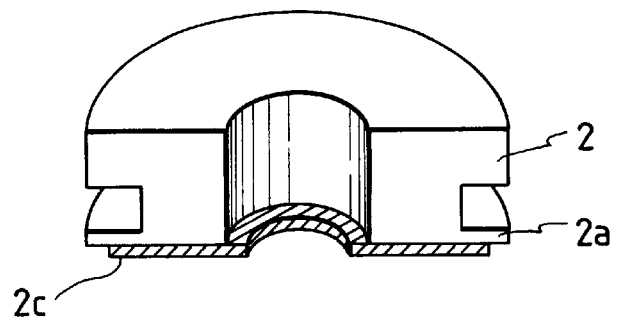
FIG. 16 is a perspective view of a rotor according to a modification of the first embodiment.

Referring now to FIG. 16, as a method of setting the neutral plane N of the flexure at the contact position of the rotor 2 at a level lower than the contact surface, base portion 2c may be a discreet member consisting of a material having a higher rigidity than that of the rotor material, and may be joined thereto to serve as the thick base portion.

Figure 21:
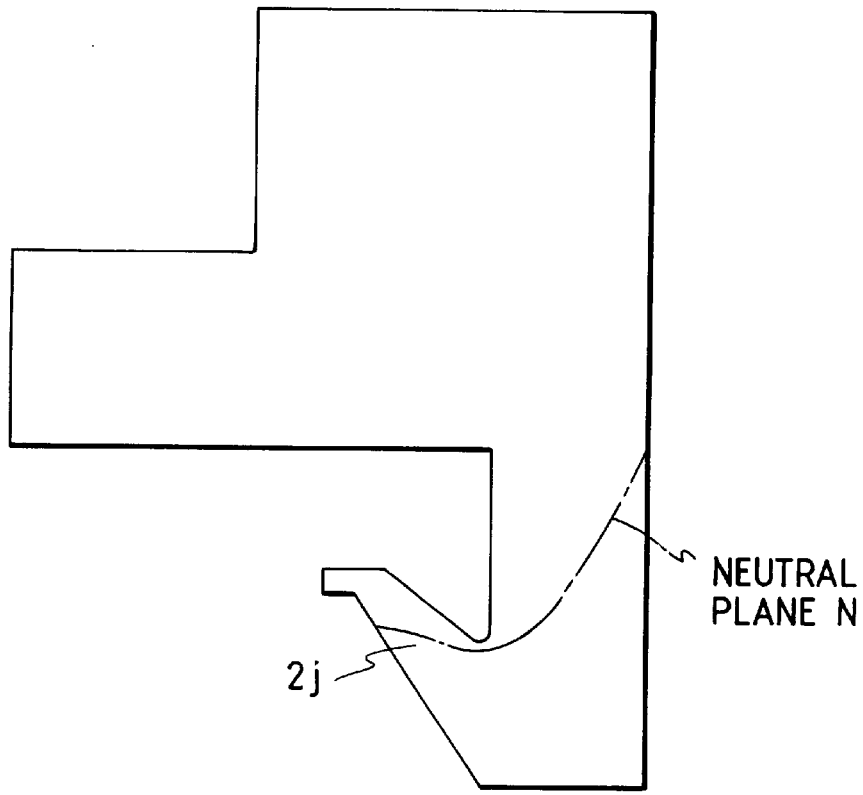
FIG. 21 is a partial sectional view of a rotor according to another modification of the first embodiment.

Also, as shown in FIG. 21, the contact spring portion of the rotor may be temporarily bent upward from the axially downward extending end portion, and a bent end portion 2j may be used as the contact portion. In this manner, the neutral plane N of the flexure at the contact position of the rotor 2 can be set at a level lower than the contact surface.

Figure 17:
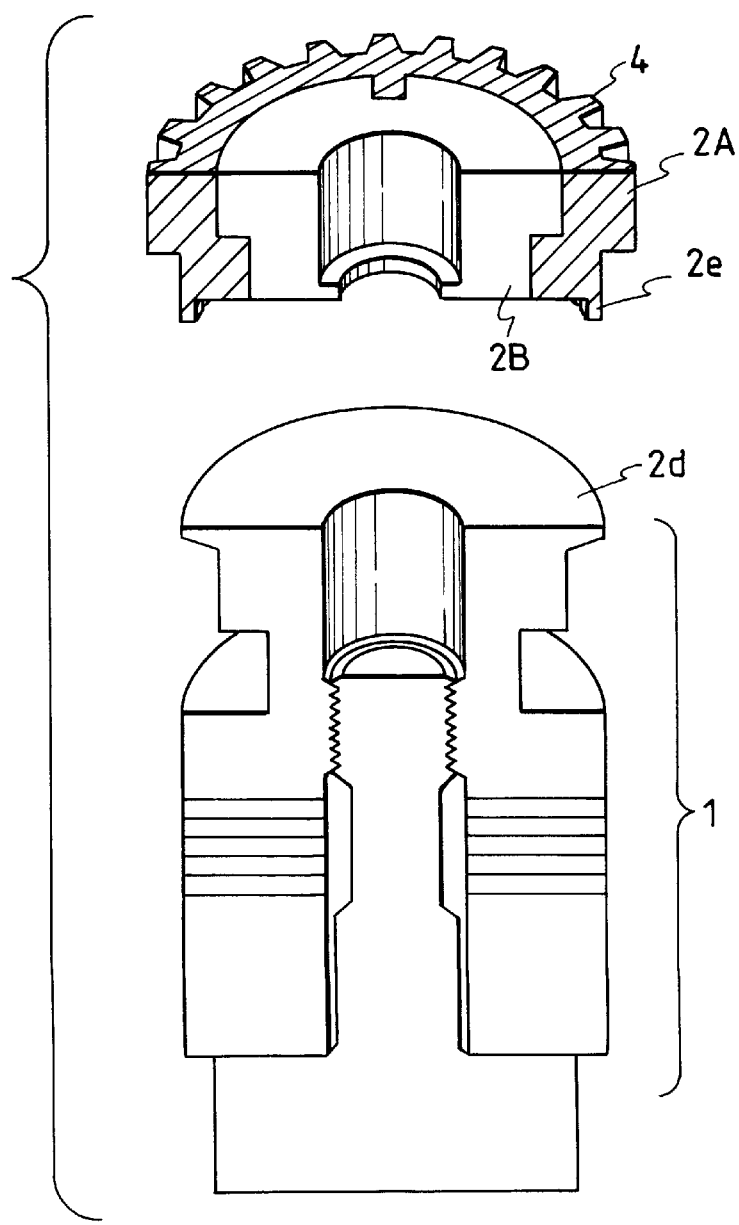
FIG. 17 is a perspective view showing a second embodiment.

FIG. 17 shows a second embodiment of the present invention.

Figure 18:
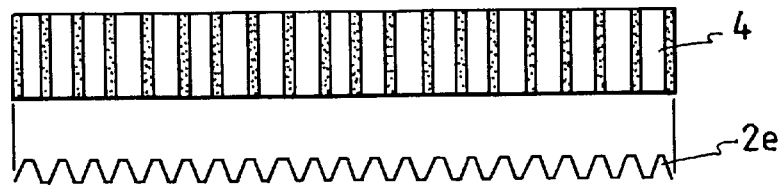
FIG. 18 is an exploded view of a rotor contact spring portion shown in FIG. 17.

A rotor 2 of this embodiment also serves as an output member since an outer circumferential portion 2A having a gear 4 consisting of a synthetic resin is joined to the outer circumferential surface of a metal inner circumferential base portion 2B for supporting a spring load. As shown in the exploded view in FIG. 18, a contact spring portion 2e having a trapezoidal cross-section is formed on the lower portion of the outer circumferential portion 2A to obtain good frequency response. The contact spring portion 2e is formed to have resiliency in both the circumferential and radial directions.

Since this contact spring portion 2e is formed on the outer peripheral edge of the rotor 2, a contact spring portion 2d of an oscillator 1 is formed on a flange thereof so as to assure a contact state with the contact spring portion 2a of the rotor 2.

Figure 19A:
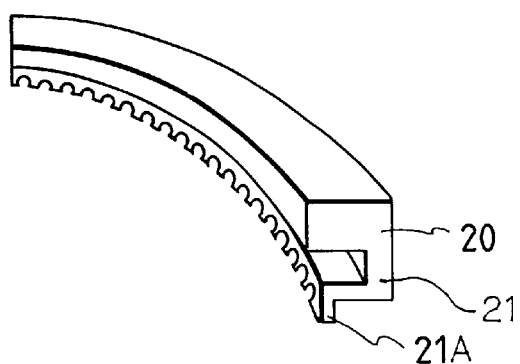
FIGS. 19A and 19B are respectively a partial perspective view and an enlarged sectional view of a rotor of a ring-shaped vibration driven motor according to a third embodiment.
Figure 19B:
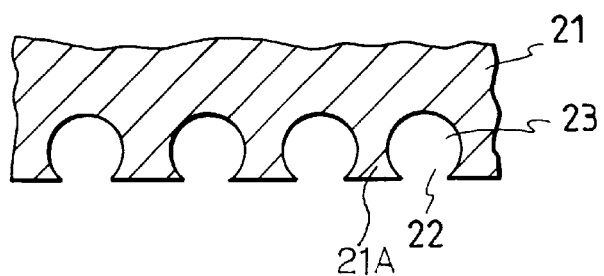

FIGS. 19A and 19B show a third embodiment of the present invention.

This embodiment relates to a ring-shaped vibration driven motor. FIG. 19A is a partial perspective view of a rotor of the motor, and FIG. 19B is an enlarged sectional view of the rotor.

In this embodiment, projections 21A for amplifying a circumferential displacement are formed in the circumferential direction on a contact spring portion 21 projecting downward from the inner peripheral portion of a rotor 20, thereby absorbing a speed difference in the circumferential direction.

Since a large number of slits for amplifying a circumferential displacement are normally formed on the driving surface of an oscillator of the ring-shaped vibration driven motor, circular gaps 23 each having a narrow opening width 22 are formed, as shown in FIG. 19B, so as to prevent the projections 21A of the rotor 20 from being fitted in the grooves between the slits, and to assure proper resiliency in the circumferential direction.

Figure 22:
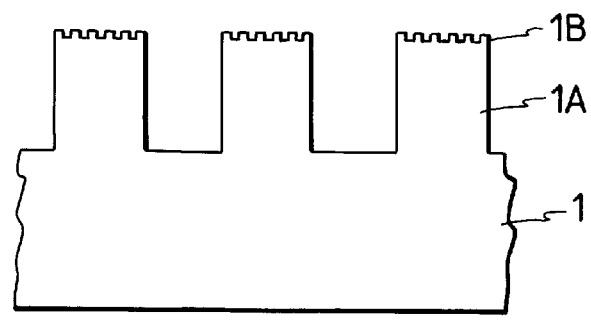
FIG. 22 is a sectional view showing a modification of the third embodiment.

Furthermore, as shown in FIG. 22, spring portions 1B which can be displaced in the circumferential direction may be formed on the contact surface portion of each of projections 1A for amplifying a vibration of the oscillator of the ring-shaped vibration driven motor.

As a ring-shaped vibration driven motor, a linear motor, in which an elliptic oscillator is formed to have a linear portion, and an object is pressed against the linear portion, has already been proposed. In this case, the structure portion of a contact spring of the object may be the same as described above.

Figure 20A:
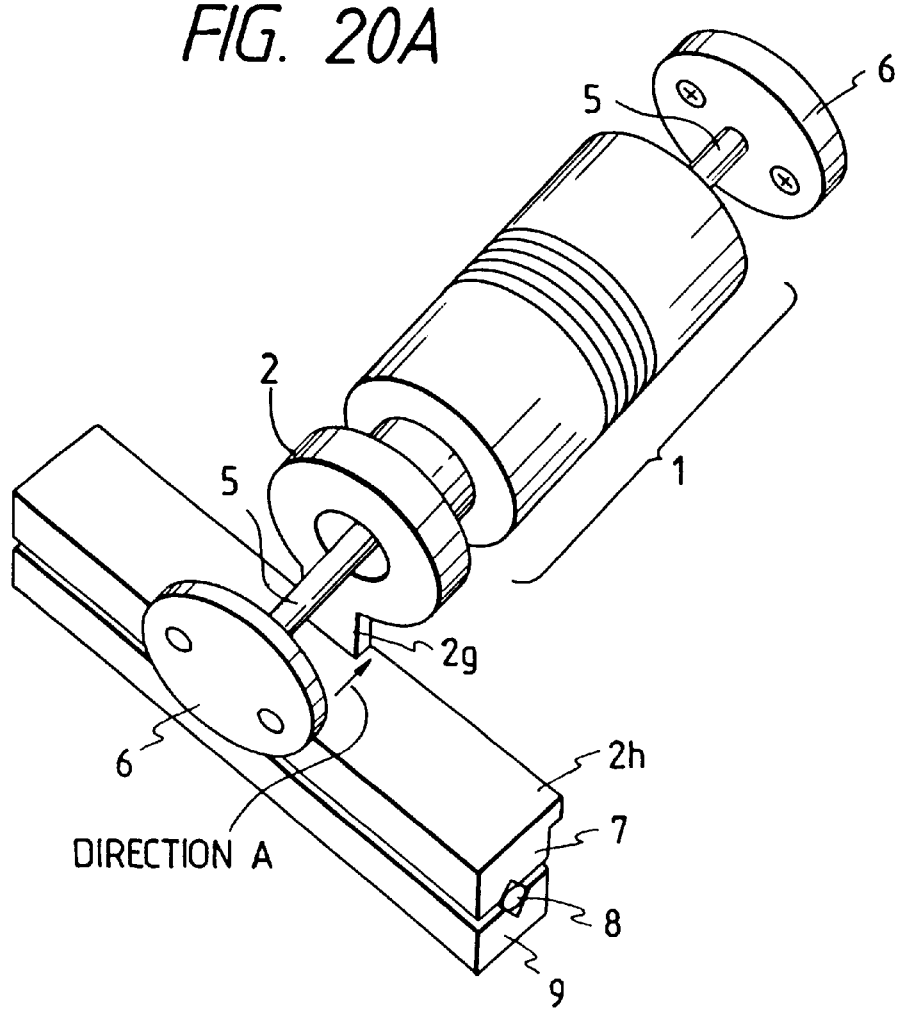
FIGS. 20A and 20B are respectively a perspective view and a sectional view showing the fourth embodiment.
Figure 20B:
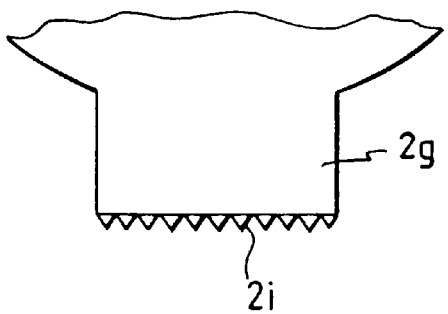

FIGS. 20A and 20B show a fourth embodiment of the present invention.

In this embodiment, a rod-shaped vibration driven motor is used as a linear motor. Flanges 6 of an oscillator 1 are fixed to a mounting member (not shown) via a support pin 5, and a slide member 7 which is slidable along a guide shaft 9 via balls 8 is driven by a rotor 2 of the vibration driven motor. The rotor 2 has a contact spring portion 2g which projects radially, and has flexibility in the axial direction. Projections 2i are formed on the end portion of the contact spring portion 2g by, e.g., a transfer method using a resin having a wear resistance. These projections 2i are formed to have a triangular section, and have flexibility in the moving direction of the slide member 7.

Figure 23:
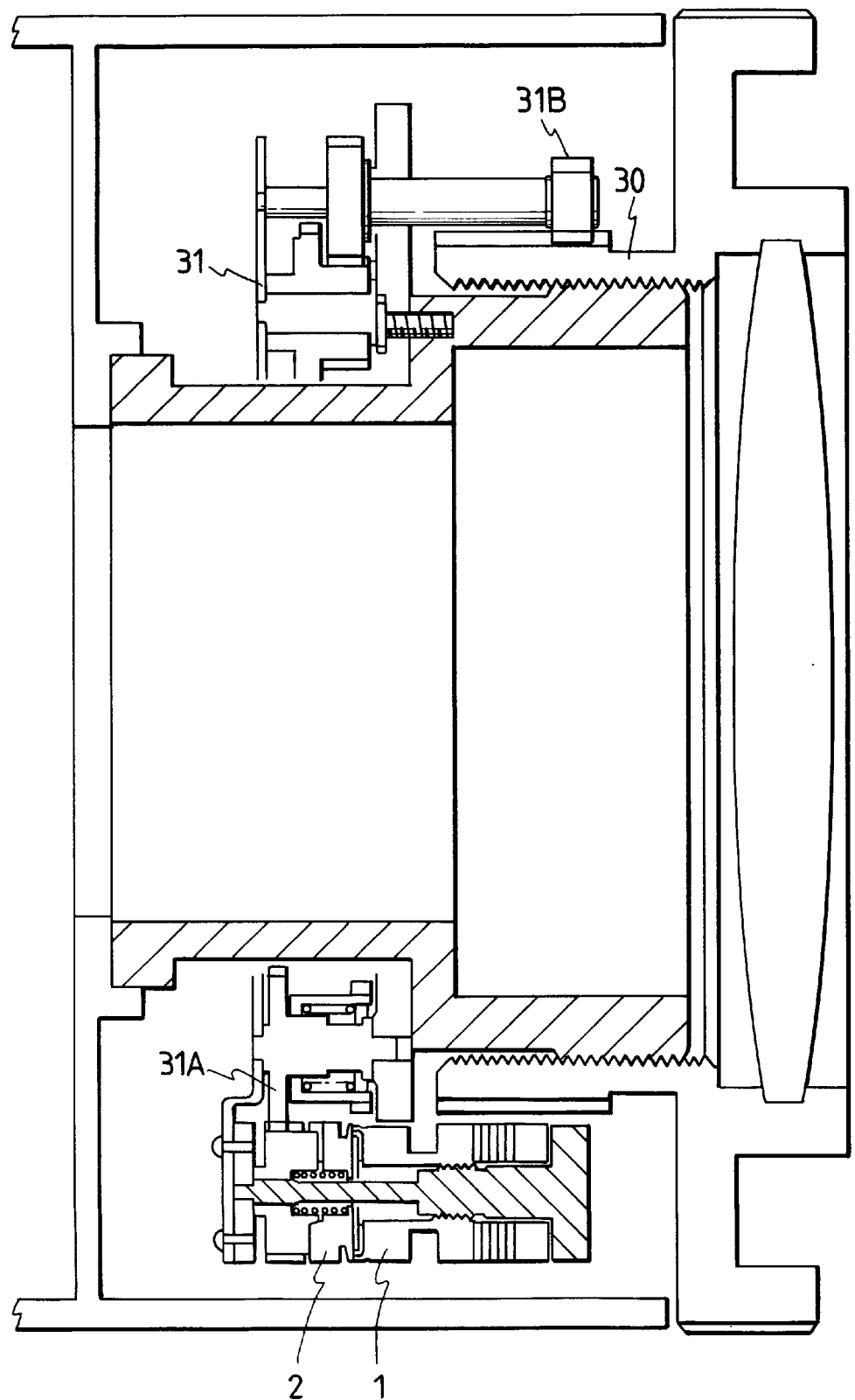
FIG. 23 is a sectional view of a lens barrel using the vibration driven motor of the first embodiment as an AF motor.

FIG. 23 shows an AF driving system of a lens barrel which uses the vibration driven motor of the first embodiment of the above-mentioned embodiments as a driving source. A lens holding frame 30 is driven by the rotational force of the vibration driven motor via a reduction gear 31. The driving force of the vibration driven motor is transmitted to an output gear 31B via an input gear 31A, and rotates the lens holding frame.

According to the present invention, the sliding loss can be reduced, and improvement of motor efficiency, improvement of wear resistance, prevention of noise generation, and the like can be realized.

The above-mentioned invention can also be applied to a motor in which a rotor 2 is fixed, and a stator 1 rotates.

What is claimed is:

1. A vibration driven motor or actuator, comprising:

a vibration member, having a contact portion, for generating a vibration therein; and a contact member including a contact portion having a contact surface which is in contact with the contact portion of said vibration member substantially on a contact plane, said vibration member being located substantially on one side of the contact plane, a vibration generated in said vibration member causing relative movement between said vibration member and said contact member, and the contact portion of said contact member having a structure and configuration that provides, in a region proximate to where the contact surface of the contact member is in contact with the contact portion of the vibration member, a neutral plane of a vibration generated in said contact member that is located on the same side of the contact plane as said vibration member.

2. A motor or actuator according to claim 1, wherein said contact member is composed of a first member made of a first material, and a neutral plane adjustment member made of a second material different from the first material connected to a surface of said first member and facing said vibration member.

3. A motor or actuator according to claim 1, wherein said contact portion includes a contact spring portion that projects from said contact member in a direction of said vibration member.

4. A system driven using as a driving source a vibration driven motor or actuator according to claim 1.

5. A system driven using as a driving source a vibration driven motor or actuator according to claim 2.

6. A system driven using as a driving source a vibration driven motor or actuator according to claim 3.

7. A vibration driven motor or actuator, comprising:

a vibration member, having a contact portion, for generating a vibration therein; and a contact member having a contact portion which is in contact with the contact portion of said vibration member, said vibration causing relative movement between said vibration member and said contact member, wherein the contact portion of said contact member or the contact portion of said vibration member is divided into a plurality of projections, each projection further comprising projection means formed in a contact surface of said projection for reducing a localized relative velocity between said projection and a contact surface of the other one of said contact member and said vibration member.

8. A motor or actuator according to claim 7, wherein said projections means includes a plurality of finely divided contact portions that are deformable based on a relative speed difference between the contact portion of said contact member and the contact portion of said vibration member.

9. A motor or actuator according to claim 8, wherein said finely divided plurality of contact portions are formed in said vibration member.

10. A system driven using as a driving source a vibration driven motor or actuator according to claim 7.

11. A system driven using as a driving source a vibration driven motor or actuator according to claim 8.

12. A system driven using as a driving source a vibration driven motor or actuator according to claim 9.

13. A vibration driven motor or actuator, comprising:

a vibration member, including a contact portion having a contact surface, for generating a vibration therein; and a contact member including a contact portion having a contact surface which is in contact with the contact surface of the contact portion of said vibration member substantially on a contact plane, said vibration causing relative movement between said vibration member and said contact member, the contact portion of said contact member having means for reducing the relative speed of the contact surface of one of said contact portions to the contact surface of the other of said contact portions at a contact position between the contact portion of said contact member and the contact portion of said vibration member.

14. A system driven using as a driving source a vibration driven motor actuator according to claim 13.

* * * * *

UNITED STATES PATENT AND TRADEMARK OFFICE
CERTIFICATE OF CORRECTION

PATENT NO. : 5,917,270
DATED : June 29, 1999
INVENTOR(S) : TAKAYUKI TSUKIMOTO, ET AL.

It is certified that error appears in the above-identified patent and that said Letters Patent is hereby corrected as shown below:

At [56] References Cited

FOREIGN PATENT DOCUMENTS

"4091672  3/1992  Japan." should read
--4-091672  3/1992  Japan.--; and
"491672  3/1992  Japan." should be deleted.

Column 1

Line 17, "side" should read --sides--.

Column 2

Line 13, "a" (first occurrence) should be deleted.
Line 18, "the" should be deleted.
Line 20, "the" should be deleted; and "slip" should read --slippage--.
Line 40, "an" should be deleted.
Line 66, "travel." should read --travels.--.

UNITED STATES PATENT AND TRADEMARK OFFICE
CERTIFICATE OF CORRECTION

PATENT NO.    : 5,917,270
DATED         : June 29, 1999
INVENTOR(S)   : TAKAYUKI TSUKIMOTO, ET AL.

It is certified that error appears in the above-identified patent and that said Letters Patent is hereby corrected as shown below:

Column 4

Line 8, "divided" should be deleted.
    Line 9, "because" should read --because,--.
    Line 13, "divided" should be deleted.
    Line 59, "contact portion" should read --contact spring portion--.

Signed and Sealed this

Fourth Day of January, 2000

Attest:

Attesting Officer          Acting Commissioner of Patents and Trademarks